United States Patent [19]

Liu

[11] Patent Number: 5,394,326
[45] Date of Patent: Feb. 28, 1995

[54] AIR BAG DEPLOYMENT CONTROL SYSTEM AND METHOD

[75] Inventor: Jiyao Liu, Kokomo, Ind.

[73] Assignee: Delco Electronics Corporation, Kokomo, Ind.

[21] Appl. No.: 185,342

[22] Filed: Jan. 24, 1994

[51] Int. Cl.$^6$ ............... B60R 21/16; B60R 21/32
[52] U.S. Cl. ............... 364/424.05; 340/436; 307/10.1; 280/735; 180/282
[58] Field of Search ............ 364/424.05; 280/735; 307/10.1; 340/436, 438; 180/282

[56] References Cited

U.S. PATENT DOCUMENTS

| | | | |
|---|---|---|---|
| 4,979,763 | 12/1990 | Blackburn | 280/735 |
| 5,065,322 | 11/1991 | Mazur et al. | 364/424.05 |
| 5,182,459 | 1/1993 | Okano et al. | 307/10.1 |
| 5,216,607 | 6/1993 | Diller et al. | 364/424.05 |
| 5,256,904 | 10/1993 | Tohbaru | 307/10.1 |

OTHER PUBLICATIONS

USSN 07/797,850, filed 26 Nov. 1991, assigned to General Motors Corp. Copy of application and drawings attached.

*Primary Examiner*—Gary Chin
*Assistant Examiner*—Tyrone V. Walker
*Attorney, Agent, or Firm*—Mark A. Navarre

[57] ABSTRACT

An apparatus and method for deployment of an air bag installed in an automotive vehicle. The control includes a senor for sensing vehicle deceleration due to a collision and a processor operatively connected to the sensor. The sensor generates a deceleration signal which is analyzed by the processor. The processor calculates velocity and signal energy from the deceleration signal, and compares the velocity and signal energy to predefined velocity and energy thresholds, respectively. The processor also generates a deployment signal when both the velocity and energy signals exceed the respective thresholds. In the method for controlling the deployment of an air bag, vehicle deceleration due to a collision is sensed and a deceleration signal is generated therefrom. The velocity signal and energy signals are then calculated and compared to the respective predefined velocity and energy thresholds. If the velocity signal exceeds the velocity threshold and the signal energy exceeds the energy threshold, a deployment signal is generated.

6 Claims, 6 Drawing Sheets

AIR BAG DEPLOYMENT CONTROL SYSTEM AND METHOD

BACKGROUND OF THE INVENTION

1. Field of the Invention

The present invention relates to a control system for deployment of an air bag situated in a vehicle, and, more particularly, to an apparatus and method for controlling deployment of the air bag under various collision conditions.

2. Description of the Related Art

Vehicles are now being provided with one or more air bags to provide protection to a passenger in the event of certain vehicle collisions. In fact, the employment of an air bag in vehicles is becoming mandatory in some countries. Accompanying such an air bag is a deployment control system for controllably deploying the air bag under only appropriate circumstances. For example, an air bag should be deployed when the front of the vehicle impacts an obstruction at a sufficient speed, such as 30 mph, or when the vehicle impacts a pole-like obstruction at a sufficient speed. However, an air bag should not be deployed if the vehicle is simply operating on a rough road or is slowly running over the top of a small obstruction, such as a curb.

To distinguish between various types of collisions, air bag deployment control systems, such as the control disclosed in U.S. Pat. No. 5,067,745, analyze deceleration data collected from an accelerometer disposed at some location in the front of the vehicle. Other controls, such as that disclosed in Japanese Published Unexamined (Kokai) Patent Application No. 55-19627, use an array of sensors disposed in the front of the vehicle. Because it is difficult, if not impossible, to timely distinguish a slight collision, i.e., one not requiring deployment, from a serious collision, i.e., one requiring deployment, from solely an analysis of the speed change values (velocity) collected from the accelerometer, various methods of analysis have developed in the prior art.

Considering the various methods of analysis employed in air bag deployment control, in U.S. Pat. No. 5,067,745, the deceleration signal detected by the accelerometer is decomposed through filtering and then the low-frequency components of the deceleration detection signal are combined with the high frequency components and then compared to a predetermined constant value at a particular critical point in time to determine whether a serious collision has occurred. In other systems, such as the system discussed in association with FIG. 2 herein, the velocity, energy, and oscillation is calculated from the deceleration signal and compared to respective calibrated, time-dependent boundary curves for velocity, energy and oscillation. In general, when the quantity calculated at any point in time exceeds the applicable boundary curve at that point in time, the air bag is deployed.

The calculations required by the analysis employed must be accomplished in a short amount of time, such as 30 milliseconds, which is shorter in the severe collision and longer in the slight collision. This critical time is determined by the need to deploy the air bag in an expedient manner to adequately protect the occupant of the vehicle. Furthermore, controls which compare the computed velocity, energy and oscillation to time-dependent boundary curves require complex calculations. Therefore, it is desired to provide an air bag deployment control system which minimizes the amount and complexity of calculations necessary to ascertain whether the air bag should be deployed.

In systems which utilize time-dependent boundary curves for comparison to computed time-dependent values, the time-dependency of the boundary curves necessitates a level of accuracy which often requires numerous crash tests under each of a variety of collision conditions to be performed to obtain the time-dependent boundary curves. It is preferable to reduce the number of crash tests required to determine the proper comparison data.

Also, when employing boundary curves in the analysis performed by the control, significantly more memory is required for storage of the boundary curve(s) than is necessary when utilizing a constant threshold for comparison purposes. The requirement for additional memory increases the cost of the control system. It is therefore desired to provide an effective air bag deployment control system which does not utilize time-dependent boundary curve(s) for comparison purposes to thereby reduce the costs of such a control by minimizing the control's memory requirements.

As previously noted, some control systems, such as that disclosed in U.S. Pat. No. 5,067,745, utilize particular frequency components of the deceleration signal for its analysis. This results in additional manufacturing costs as a filter is required to separate the frequency components of the deceleration signal. It is desired to develop an air bag deployment control system which does not require a special filter to thereby reduce manufacturing costs.

In general, the air bag deployment control systems of the prior art utilize various combinations of calculated values of velocity, energy, and oscillation to determine whether or not the air bag should be deployed. In using these values, there still exists the potential for having difficulty in distinguishing a low-speed, frontal barrier collision in which the air bag is not to be deployed from a higher speed, pole impact collision in which the air bag is to be deployed. Therefore, it is desired to provide an air bag deployment control system which utilizes a function calculated from the deceleration data collected which more effectively distinguishes the low-speed, frontal barrier collision from a higher speed, pole impact collision.

SUMMARY OF THE INVENTION

The present invention provides a control and a method for deployment of an air bag installed in an automotive vehicle. To determine whether the air bag is to be deployed when a collision occurs, discrete, calibrated, predefined thresholds are compared to the velocity and a high order signal energy calculated from a deceleration signal provided by an accelerometer. The analysis employed in the control and method of the present invention provides several advantages over analysis techniques used by air bag deployment controls of the prior art.

The invention comprises, in one form thereof, a control for deployment of an air bag. The control includes a means for sensing vehicle deceleration and a processing means operatively connected to the sensing means. The sensing means generates a deceleration signal which is provided to the processing means. The processing means includes a means for calculating velocity and energy signals from the deceleration signal and a means for comparing the velocity and energy signals to predefined velocity and energy thresholds, respectively. The processing means also includes a means for generating a deployment signal when both the velocity and energy signals simultaneously exceed the respective threshold. No deployment signal is generated if either the velocity signal or the energy signal does not exceed its respective threshold.

In one embodiment thereof, the sensing means comprises an accelerometer and the processing means comprises a microprocessor having software executing thereon. In another possible embodiment, the sensing means generates an analog deceleration signal and the control further comprises an analog to digital converter connected to the sensing means and the processing means to convert the analog deceleration signal of the sensing means to a digital deceleration signal to be analyzed by the processing means.

In another possible embodiment thereof, the velocity signal is calculated by taking the integral of the deceleration signal. The energy signal relates to the deceleration signal taken to a predetermined power.

The invention comprises, in another form thereof, a method for controlling the deployment of an air bag. The first step involves sensing vehicle deceleration caused by a collision with an accelerometer disposed on the vehicle, and generating a deceleration signal therefrom. Then, a velocity signal and an energy signal are calculated from the deceleration signal. The velocity signal is compared to a calibrated, predefined velocity threshold and the energy signal is compared to a calibrated, predefined energy threshold. A deployment signal is generated when both the velocity signal exceeds the velocity threshold and the energy signal exceeds the energy threshold.

In one embodiment thereof, the velocity threshold employed in the method is a single discrete value applicable over the entire time range of the deceleration and velocity signals. In another embodiment thereof, the energy threshold comprises a small plurality of discrete threshold values, such as two values. Each discrete value is applicable over a predetermined successive time period with the first of the discrete values being applicable beginning with the commencement of the collision. When using such an energy threshold, the method further comprises, prior to comparing the energy signal to the threshold, the step of determining which of the discrete energy thresholds is applicable by determining the time expiring since the beginning of the deceleration signal.

An advantage of the present invention is the provision of an air bag deployment control which employs an analysis technique that limits the amount of computations required prior to air bag deployment, thereby minimizing the throughput requirement of the processor of the control and ensuring that the calculations are completed with sufficient speed to result in deployment occurring with sufficient expediency to adequately protect the occupant.

Another advantage is the provision of an analysis technique for an air bag deployment system which utilizes few threshold values to thereby reduce the memory requirements of the control by eliminating the need to store time-dependent boundary curves.

Yet another advantage is the provision of a deployment control which utilizes thresholds that may be determined by performing a relatively small number of crash tests.

Another advantage is the provision of an air bag control which limits manufacturing costs by limiting the number of components required to perform analysis of the deceleration data.

Still another advantage of the present invention is the provision of an air bag deployment control which is able to distinguish a serious collision in which the air bag is to be deployed from a slight collision in which the air bag is not to be deployed.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
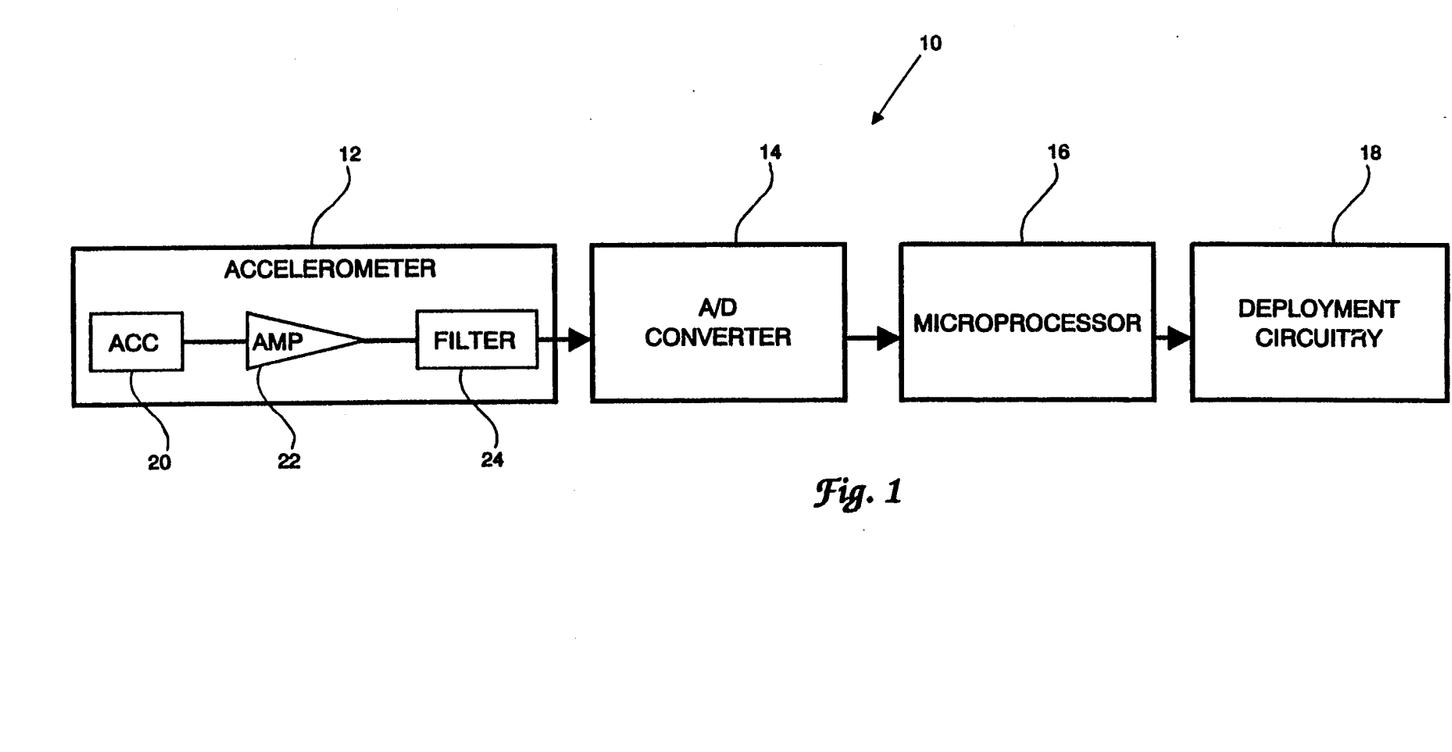
FIG. 1 is a block diagram of the air bag deployment control system of the prior art and the present invention.

Referring now to the drawings and particularly to FIG. 1, there is shown a block diagram of an air bag deployment control system. This block diagram is representative of some air bag deployment control systems of the prior art as well as the present invention. Control system 10 includes accelerometer 12 for sensing/detecting deceleration signal of the vehicle upon a collision. Accelerometer 12 is often installed in the front of the vehicle in which control system 10 is installed. For example, control system 10 may be located in the passenger compartment of the vehicle such as on the bar supporting the driver and passenger seats. Accelerometer 12 may be positioned on the beam supporting the radiator or the bar on top of the radiator. Changes in vehicle speed detected by accelerometer 12 are converted to a deceleration signal by accelerometer 12. In this embodiment, the deceleration signal generated by accelerometer 12 is an analog signal which is converted to a digital deceleration signal by A/D converter 14. A/D converter is connected to microprocessor 16. By providing the digital signal generated by A/D converter to microprocessor 16, microprocessor 16 analyzes the digital deceleration signal to ascertain whether the air bag should be deployed. If the air bag is to be deployed, microprocessor 16 generates a deployment signal. Connected to microprocessor 16 is deployment circuitry 18 which, upon receipt of the deployment signal generated by microprocessor 16, causes deployment of an air bag (FIGS. 2 and 3) attached thereto.

In the embodiment of FIG. 1, accelerometer 12 includes acceleration sensor 20, amplifier 22 for amplifying the signal generated by acceleration sensor 20, and filter 24 for filtering the amplified signal. Many accelerometers known in the art combine the functionality of sensor 20, amplifier 22 and filter 24. It will be appreciated, however, that accelerometer 12 may be comprised of three separate elements rather than one packaged accelerometer as shown in FIG. 1. It is also possible that accelerometer 12 and A/D converter 14 may be combined as a single component, i.e., a digital accelerometer, or that A/D converter 14 and microprocessor 16 may be combined into a single chip. Further, the functionality of microprocessor 16 as discussed herein may be accomplished by means other than a microprocessor having software executing thereon. It will be appreciated by those of skill in the art that hardware, such as an application specific integrated circuit or hard wired discrete logic elements, may be used in place of microprocessor 16.

Figure 2:
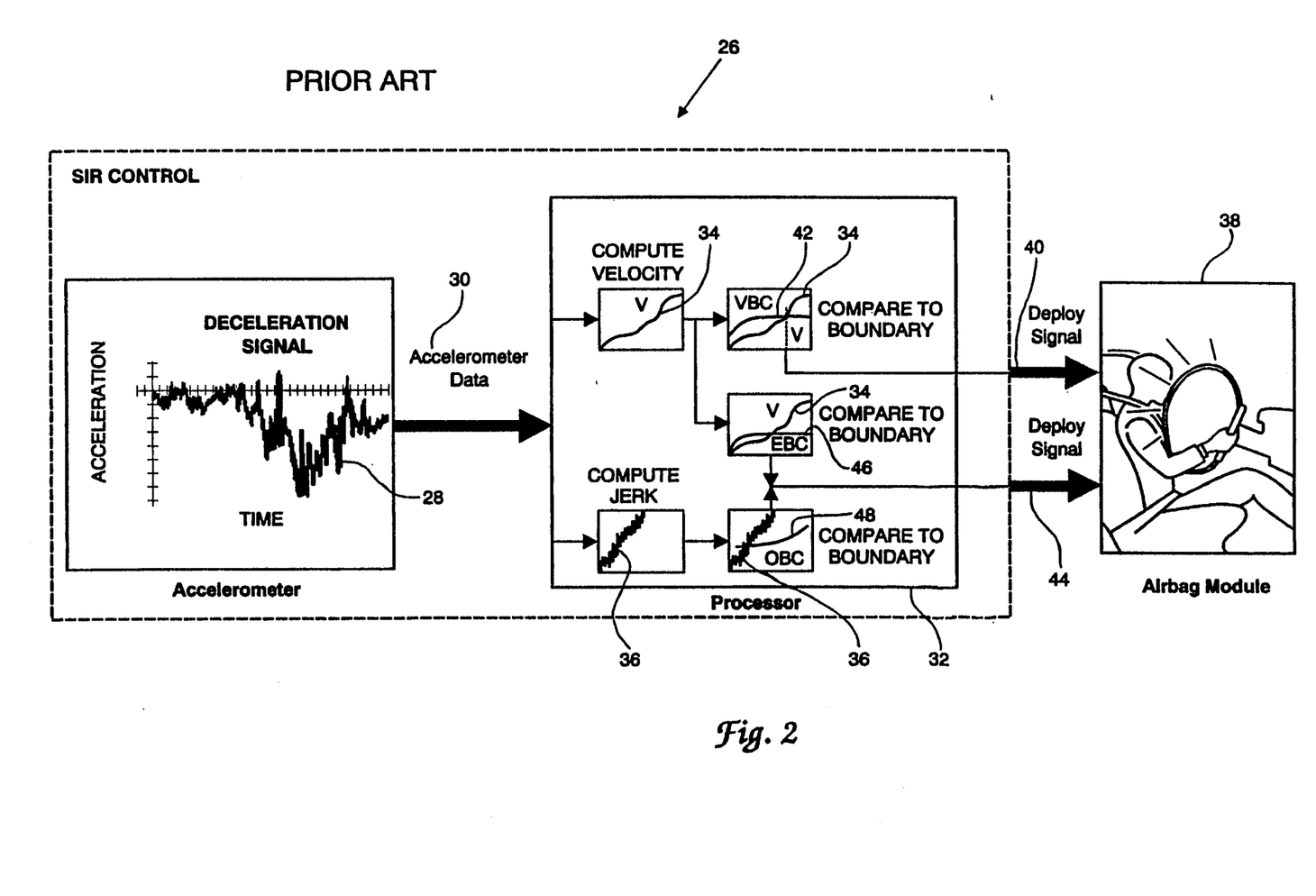
FIG. 2 is a block diagram of the system configuration and data analysis performed for a prior art air bag deployment control system.

FIG. 2 shows a block diagram of the system configuration and data analysis performed by the processing means of the system for a prior art air bag deployment control system. SIR (Supplemental Inflatable Restraint) control 26 comprises accelerometer 12, A/D converter 14 and microprocessor 16 in the embodiment of FIG. 1. Accelerometer 12 collects deceleration signal 28 which is provided, in this system, in digital form as accelerometer data 30 to processor 32. From accelerometer data 30, processor 32 calculates velocity signal 34 and jerk signal 36 in a manner well known in the art. Velocity signal 34 is determined by taking the integral of accelerometer data 30 and is representative of the relative velocity of the occupant of the vehicle to the vehicle. Jerk signal 36, in this embodiment, is defined as the accumulative integral of the absolute difference of the deceleration data. In this embodiment, $$Jerk_i = \Sigma |a_i - a_{i-2}|/2*delt(t)$$

where delt(t) is the time interval between successive digitized acceleration data points $a_i$. Though jerk is defined as the differentiation of the acceleration signal a(t) with respect to time ($Jerk_t = da(t)/dt$), which, for a digitized signal corresponds to $$Jerk_i \Sigma |a_i - a_{i-1}|/delt(t)$$

The use of the former expression makes the function monotonic and more stable.

In this prior art control system, two different conditions give rise to the generation by processor 32 of a deployment signal to air bag module 38. Air bag module 38 includes deployment circuitry and the air bag itself. First, deployment signal 40 is generated at the point in time in which velocity signal 34 exceeds VBC (Velocity Boundary Curve) 42. Second, deployment signal 42 occurs when velocity signal 34 exceeds EBC (Energy Boundary Curve) 46 at the same time that jerk signal 36 exceeds OBC (Oscillation Boundary Curve) 48.

To deploy the air bag in an acceptable time period, such as 30 milliseconds, processor 32 of the SIR control 26 must possess sufficient processing power. Processor 32 must calculate two signals—velocity signal 34 and jerk signal 36—from accelerometer data 30, compare velocity signal 34 to two time-dependent boundary curves, VBC 42 and EBC 46, and compare jerk signal 36 one time-dependent boundary curve, OBC 48, within that critical time period. In addition, sufficient memory must be provided to store time-dependent boundary curves VBC 42, EBC 46 and OBC 48, in addition to temporarily storing calculated velocity signal 34 and jerk signal 36. Though today's technology may provide sufficient processing power to make the necessary computations, the system is limited by the particular means utilized for such processing thereby making it difficult to define boundary curves which results in the correct decision regarding deployment in a timely manner.

VBC 42, EBC 46 and OBC 48 are determined by completing numerous crash tests of the vehicle under various collision conditions. The time dependency of VBC 42, EBC 46 and OBC 48 necessitates that the curves be determined with sufficient accuracy to avoid deployment when undesired and to avoid situations in which the air bag is not deployed but should be.

Figure 3:
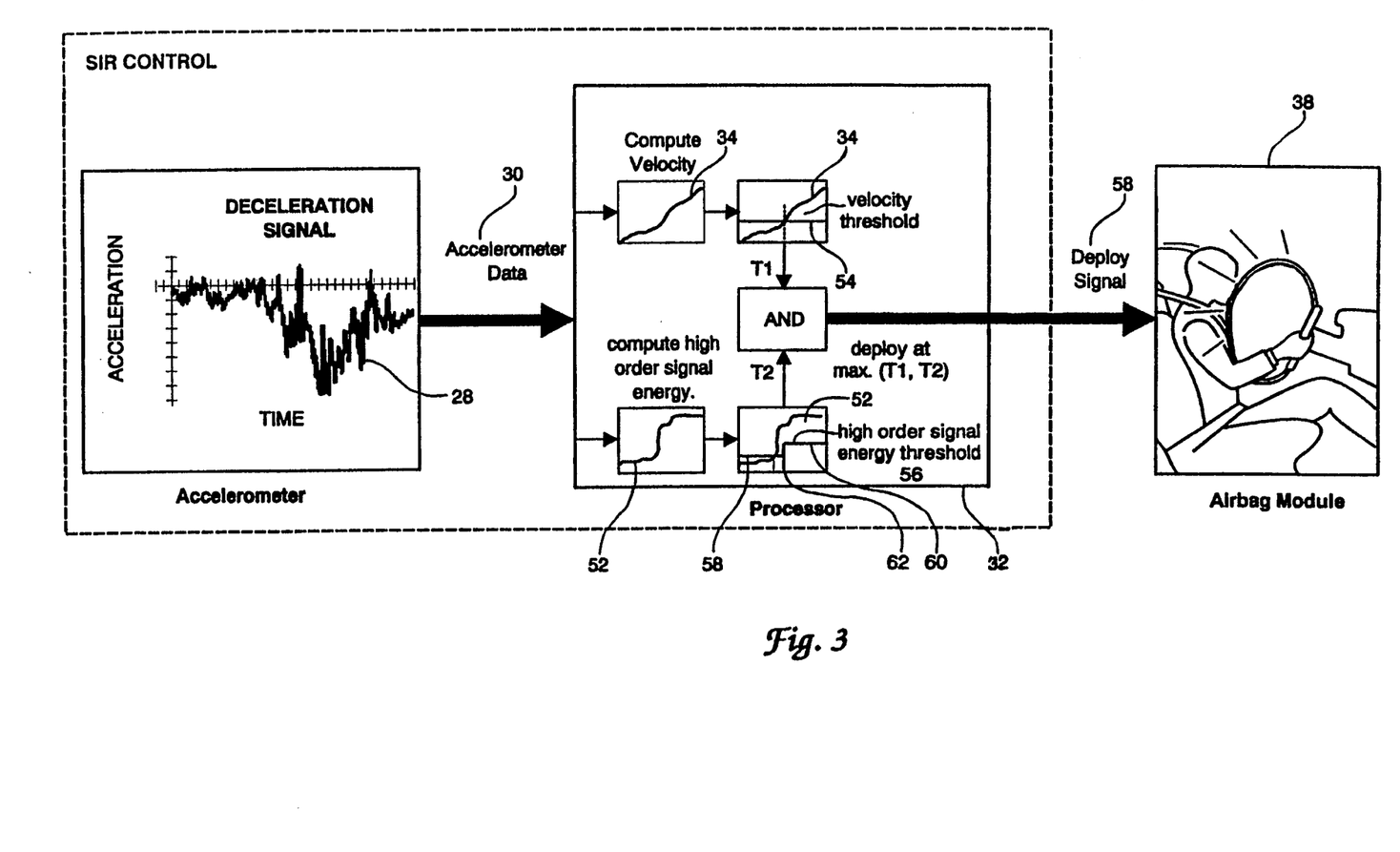
FIG. 3 is a block diagram of the system configuration and data analysis performed for one embodiment of the air bag deployment control system of the present invention.

Referring now to FIG. 3, there is shown a block diagram of the system configuration and data analysis performed for one embodiment of the air bag deployment control system of the present invention. In this embodiment, SIR control 50 includes accelerometer 12, A/D converter 14 and microprocessor 16. SIR control 50 is connected to air bag module 38, similar to the air bag module discussed with regard to FIG. 2. SIR control 50 of FIG. 3 differs from SIR control 26 shown in FIG. 2 in the processing of accelerometer data 30 performed by processor 32. As in the prior art, velocity curve 34 is calculated by taking the integral of accelerometer data 30. However, in this embodiment, no jerk curve is calculated by processor 32 and, as is explained herein, only one set of circumstances results in the generation by processor 32 of a deployment signal.

In addition to calculating velocity curve 34, processor 32 calculates high order signal energy curve 52. High order signal energy curve 52 is an accumulated value of the absolute difference between successive data points of accelerometer data 32 taken to a predetermined power, referred to herein as the "S" power. Specifically, $$\text{High Order Signal Energy} = \Sigma |(a_i - a_{i-2})/2*delt(t)|^S$$

where S is determined through an optimization procedure explained in greater detail herein. In general, velocity curve 34 is compared to velocity threshold 54 and high order signal energy curve 52 is compared to high order signal energy threshold 56. In order for processor 32 to generate deployment signal 58, velocity curve 34 must be higher than velocity threshold 54 and high order signal energy curve 52 must, at the same point in time, be greater than high order signal energy threshold 56. If only one of these conditions is met, processor 32 will not generate deployment signal 58 to thereby deploy the air bag of air bag module 38.

It will be appreciated by those of skill in the art that velocity is representative of the suddenness of the collision and energy is representative of the severity of the collision. Thus, a sudden collision alone, as may occur in a frontal collision occurring at a very low speed, does not result in deployment of the air bag. Likewise, a severe collision which is not sudden, as may occur when the vehicle hits a deer, will not result in deployment. The collision must be of sufficient suddenness and severity to result in deployment of the air bag.

In the embodiment of the control system of the present invention shown in FIG. 3, velocity threshold 54 is a constant predetermined value. It has no time dependency. High order signal energy threshold 56 comprises two discrete thresholds, first energy threshold 58 and second energy threshold 60. High order signal energy curve 52 is compared to first energy threshold 58 for times corresponding to the beginning of high order signal energy curve 52 to break point 62. For the successive time period beginning at break point 62, high order signal energy curve is compared to second energy threshold 60.

It will be appreciated that the use of a limited number of discrete thresholds means that little memory is required to store the thresholds. This is a cost advantage of the control of the present invention, particularly when compared to prior art controls using time-dependent boundary curves. Further, the analysis may be completed quickly without necessitating the use of a processor having high throughput due to the elimination of the need to search the thresholds for the threshold value corresponding a particular point in time.

It will also be appreciated that the data analyzed in the present invention is the deceleration data, not a particular frequency of the deceleration signal as is required in some prior art systems. Thus, the number of components required is minimized to thereby limit manufacturing costs of the control.

The values of velocity threshold 54 and high order signal energy threshold 56 are determined empirically. For automotive vehicles having a similar structure, crash tests are performed for a multitude of collisions, such as those required to meet applicable standards or regulations. By comparing the "deploy" conditions to the "non-deploy" conditions, the values of thresholds 54 and 56 are determined. In many instances, it is often necessary to provide only one discrete value, a value independent of time, for the velocity threshold. More than one discrete value may be required for high order signal energy threshold 56, on the other hand, as high order signal energy (an accumulated value involving the accelerometer data signal taken to a predetermined power) is much more sensitive to changes in deceleration. In particular, high order signal energy threshold 56 must accommodate the condition in which the vehicle is travelling over a rough road. The rough road condition is one in which the high order energy increases in value as time expires from the initial impact (the sensing of a change in deceleration of the vehicle upon initial engagement with the rough road). Though an increase in the high order energy occurs, the increase is less than that experienced in a collision in which the air bag is to be deployed.

The power S utilized for calculating high order signal energy curve 52 is also determined empirically. By observing the behavior of the crash test deceleration data at various powers, one power will more adequately separate the resulting high order energy for "deploy" collisions versus "non-deploy" collisions. It has been found that the value of S which separates the non-deploy low speed full frontal crash from the partial frontal crash (e.g., pole crash, angle crash, etc.) is optimal. It is possible that the optimal value S may be determined to be a fractional number, such as 3.7, for a particular category of vehicle structure; however, it may be advisable to implement an integer, such as 4, where feasible, to ease the processing requirements of processor 32 during implementation.

It should also be noted that the thresholds used in connection with the air bag control of the present invention are likely to vary depending on vehicle structure. The variation in threshold caused by variation in vehicle structure is not unique to the control of the present invention as deceleration data for a particular collision is dependent on vehicle structure. It may be desirable to ascertain thresholds for different vehicle structures. It is also possible that different values of the power S may be optimal for different vehicle structures.

Figure 4:
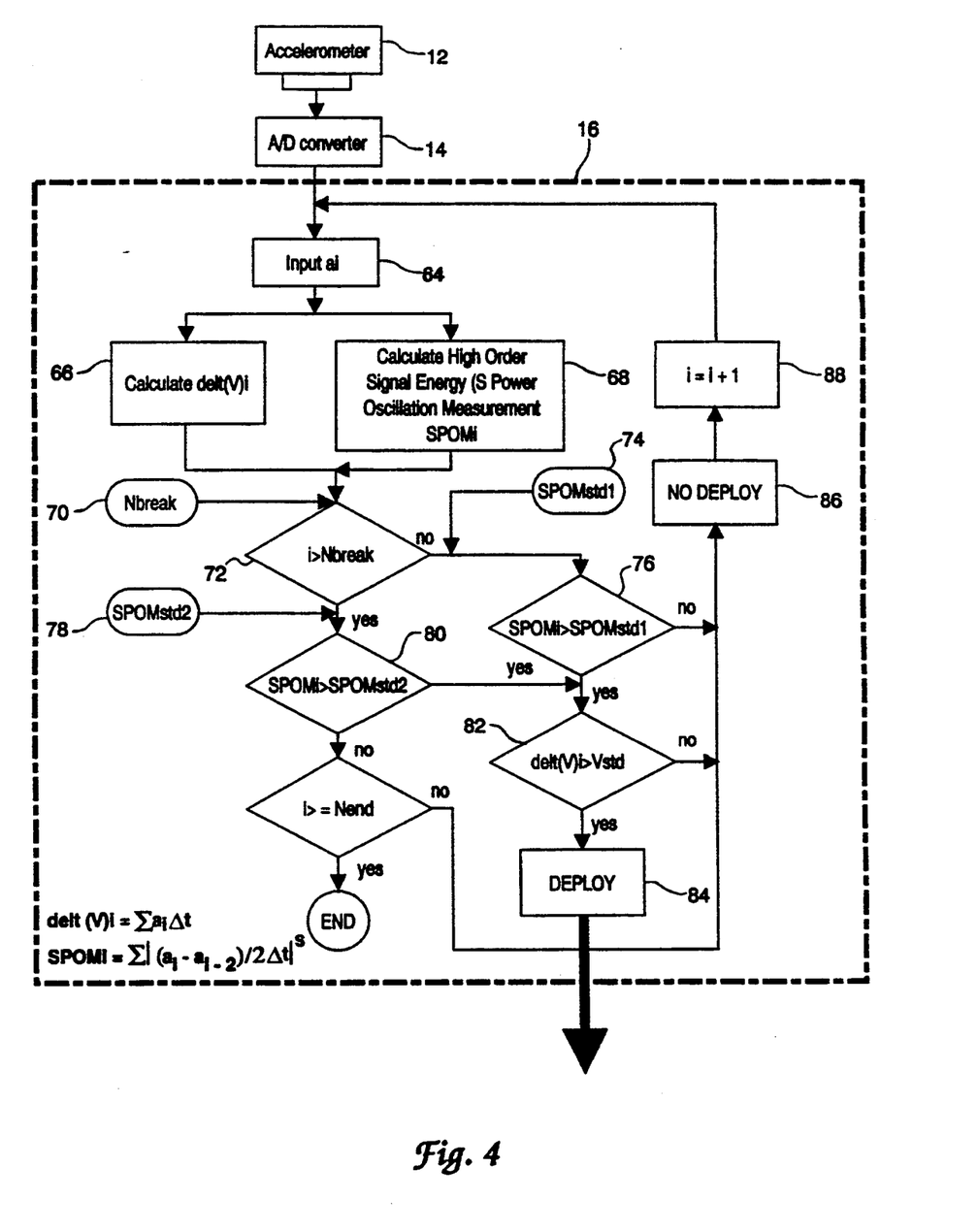
FIG. 4 is a flow chart of the decisional algorithm for air bag deployment according to the present invention.

FIG. 4 shows a flow chart of the decisional algorithm for air bag deployment according to the present invention. In this flow chart the character "i" corresponds to a counter representing an increment in time. In the event of a collision, accelerometer 12 generates an analog deceleration signal which is converted to a digital deceleration signal by A/D converter 14. Digital deceleration data point $a_i$ is read by microprocessor 16 in step 64. In steps 66 and 68, respectively, the corresponding data points for the velocity signal and the high order energy signal, delt(V)i and SPOMi, are calculated. As used herein, SPOMi means S Power Oscillation Measurement and corresponds to the high order signal energy for a particular point in time. The variables delt(V)i and SPOMi are determined as follows:

$$delt(V)i = \Sigma a_i * delt(t)$$

$$SPOMi = \Sigma |(a_i - a_{i-2})/2 * delt(t)|^S$$

where delt(t) is the time increment represented by the counter i.

At step 70, microprocessor 16 reads Nbreak and compares Nbreak to i at step 72. Nbreak corresponds to break point 62 in the embodiment of FIG. 3 and signifies whether the first or second SPOM threshold value is to be compared to the high order signal energy. Specifically, if i<=Nbreak, the first SPOM threshold, SPOMstd1, read at step 74 is compared to SPOMi at step 76, whereas if i>Nbreak, the second SPOM threshold, SPOMstd2, read at step 78 is compared to SPOMi at step 80.

Considering first the situation in which i<=Nbreak, if SPOMi is determined at step 76 to be greater than SPOMstd1, the first energy threshold, delt(V)i is compared to Vstd, the velocity threshold, in step 82. If delt(V)i is greater than Vstd, then processor 16 generates a deployment signal at step 84. If SPOMi is less than or equal to SPOMstd1 as determined in step 76 or if delt(V)i is less than or equal to Vstd as determined in step 82, processor 16 does not issue a deployment signal as indicated in step 86, counter i is incremented in step 88, and the next acceleration data point $a_i$ is read in step 64.

When i>Nbreak as determined in step 72, SPOMstd2 is compared to SPOMi in step 80. If SPOMi>SPOMstd2, then processor 16 advances to step 82 to determine whether delt(V)i exceeds the velocity threshold Vstd. If delt(V)i is greater than Vstd, a deployment signal is generated in step 84; otherwise, no deployment signal is issued in step 86, counter i is incremented in step 88, and another acceleration data point $a_i$ is read in step 64. When it is determined in step 80 that SPOMi is not greater than SPOMstd2, counter i is compared to Nend, the end time. Each deceleration signal need only be analyzed for a particular time frame, such as 100 milliseconds, because the air bag is to be deployed within a smaller critical time frame, such as 30 milliseconds. Thus, the end time Nend signifies that no further processing is required of the detected signal and processor 16 should await the input of the next deceleration signal. If i>Nend, processing of the incoming deceleration data is complete for the particular collision sensed and the system is reset.

Figure 5:
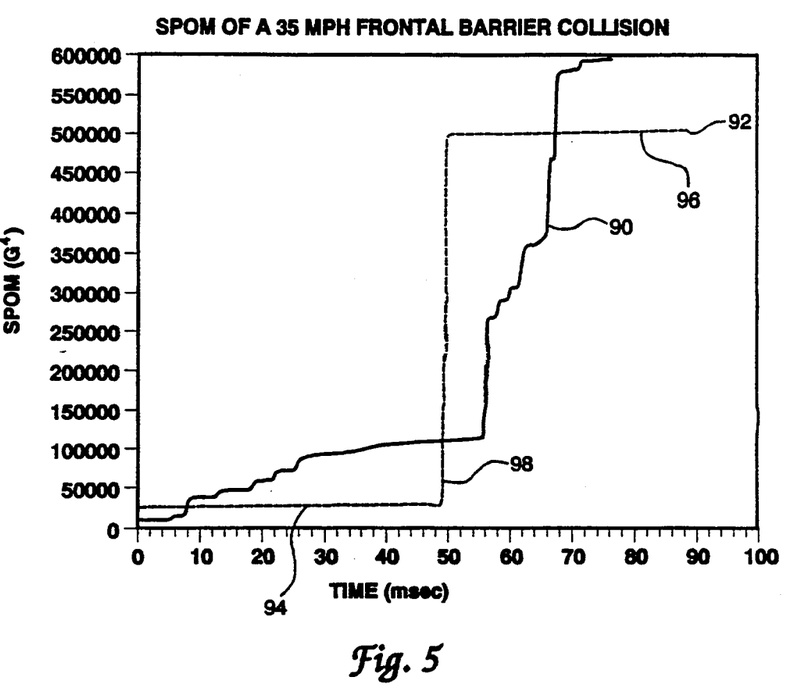
FIG. 5 is a graph of the SPOM curve compared to the SPOM threshold curve for an exemplary frontal barrier collision.
Figure 6:
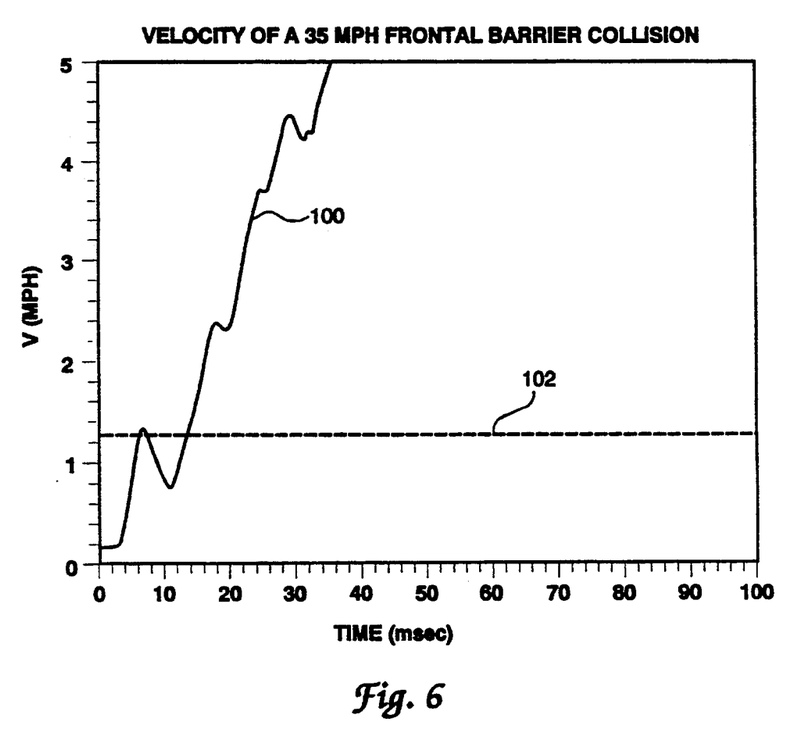
FIG. 6 is a graph of the velocity curve compared to the velocity threshold curve for the frontal barrier collision of FIG. 5.

Referring now to FIGS. 5 and 6, there are shown graphs of the SPOM curve and the velocity curve, respectively, compared to the appropriate threshold curve for an exemplary frontal barrier collision. The collision of FIGS. 5 and 6 occurred at a vehicle speed of 35 mph and constitutes a collision wherein the air bag should be deployed. In FIG. 5, the SPOM is represented by curve 90 and the high order signal energy threshold is represented by energy threshold curve 92. The power S used in this embodiment used to determine the high order signal energy is four (4). Energy threshold curve 92 was empirically determined, as previously described, for particular vehicle structure involved in the collision and is composed of first energy threshold 94 and second energy threshold 96. First energy threshold 92 is applicable from the point in time at which the collision occurs to break point 98 which is approximately 50 milliseconds after the occurrence of the collision. Second energy threshold 96 is applicable from break point 98 to the ending time for analysis which is approximately 90 milliseconds. Note that SPOM curve 90 is above first energy threshold beginning at a time of about 8 milliseconds.

In FIG. 6, the velocity calculated by the processor of the control is shown as velocity curve 100. The empirically determined velocity threshold is illustrated as velocity threshold 102 which is not time-dependent. Velocity curve 100 momentarily exceeds velocity threshold 102 at about 6 milliseconds and then continuously exceeds velocity threshold 102 at 15 milliseconds and beyond.

In following the analysis of the 35 mph frontal barrier collision illustrated in FIGS. 5 and 6 in terms of the algorithm presented in FIG. 4, at a time of 8 milliseconds, SPOM curve 90 is determined to be greater than first energy threshold 94 in step 76. However, velocity curve 100 is less than velocity threshold 102 at the time of 8 milliseconds as determined in step 82 so the air bag is not deployed at this point. At 15 milliseconds, however, SPOM curve 90 is greater than first energy threshold 94 in step 76 and velocity curve 100 is greater than velocity threshold 102 in step 82. Therefore, at 15 milliseconds, a deployment signal is generated by processor 16 at step 84.

Figure 7:
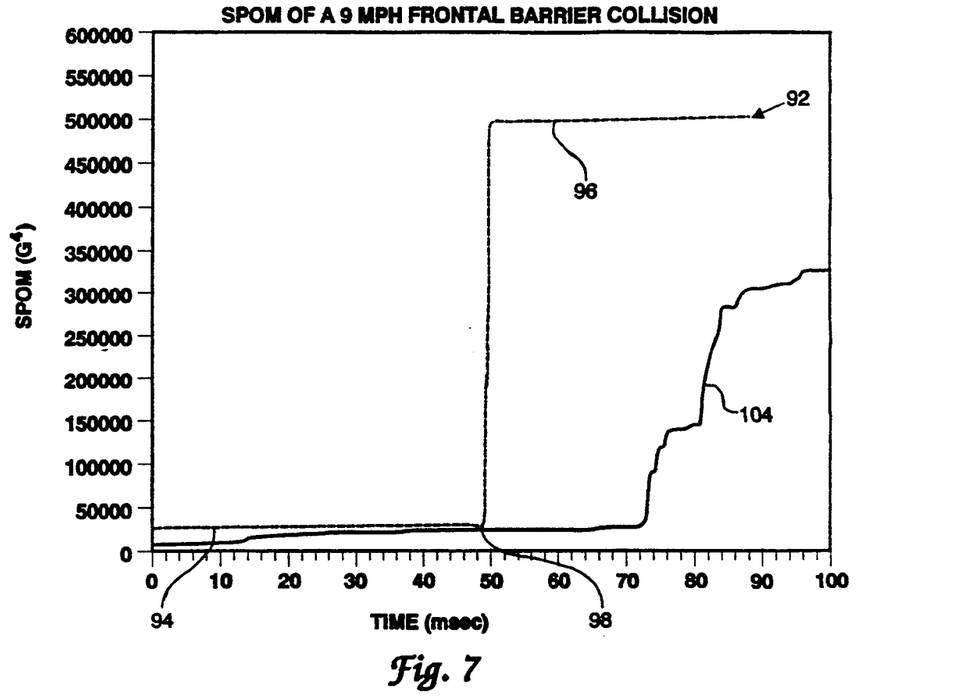
FIG. 7 is a graph of the SPOM curve compared to the SPOM threshold curve for a second exemplary frontal barrier collision.
Figure 8:
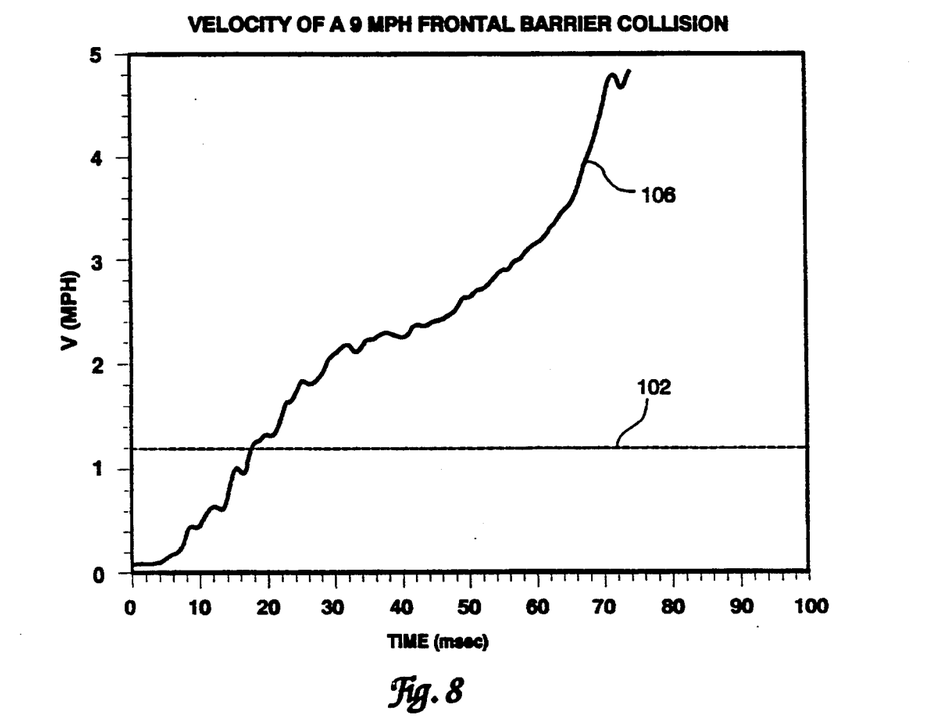
FIG. 8 is a graph of the velocity curve compared to the velocity threshold curve for the frontal barrier collision of FIG. 7.

FIGS. 7 and 8 show graphs of the SPOM curve and the velocity curve, respectively, compared to the appropriate threshold curve for a second exemplary frontal barrier collision. In FIGS. 7 and 8, the frontal barrier collision occurred at a vehicle speed of 9 mph, a condition wherein the air bag is not to be deployed. The vehicle structure for FIGS. 7 and 8 is the same as that of FIGS. 5 and 6; therefore the same velocity and energy thresholds are applied to the collision. As seen in FIG. 6, velocity curve 106 exceeds velocity threshold 102 at all points beyond approximately 18 milliseconds. However, SPOM curve 104 never exceeds energy threshold curve 92. Thus, the conditions of steps 80 and 76 of the algorithm of FIG. 4 are never satisfied and the air bag is not deployed.

It will be appreciated that the analysis performed by the processor of the air bag deployment control of the present invention is able to distinguish between a slight collision in which the air bag is not to be deployed and a serious collision in which the air bag is to be deployed. As illustrated by the graphs representing the frontal barrier collision occurring at a vehicle speed of 9 mph, analysis of velocity alone is not sufficient to distinguish such collisions as the velocity may exceed the velocity threshold (whether constant or variable) for slight collisions just as it does for a serious collision. By using energy, the severity of the collision is ascertained. In order for the collision to be deemed serious such that the air bag is deployed, both the suddenness of the collision, as ascertained by examining the velocity, and the severity of the collision, as ascertained by examining the energy, must exceed predetermined levels.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The embodiments of the invention in which an exclusive property or privilege is claimed are defined as follows:

1. An air bag deployment system for use in a vehicle, the control system comprising:
   sensing means for sensing vehicle deceleration due to a collision, said sensing means generating a deceleration signal; and
   a processor operatively connected to said sensing means and receiving the deceleration signal, said processor including:
   means for calculating the velocity and signal energy from said deceleration signal, wherein said signal energy is determined by accumulating the absolute difference of successive deceleration signal values taken to a predetermined power greater than two,
   means for comparing said velocity and signal energy to predefined discrete velocity and energy thresholds, respectively, and
   means for generating a deployment signal when both of said velocity and signal energy exceed their respective thresholds.

2. The control of claim 1, wherein said power is four.

3. The control of claim 1, wherein said signal energy is accumulated over the time expired from the beginning of a collision.

4. The control of claim 1, wherein said power is empirically chosen to distinguish between collisions which require deployment and collisions which do not require deployment.

5. A method for controlling deployment of an air bag in a vehicle, the method comprising the steps of:
   (a) sensing vehicle deceleration due to a collision and generating a deceleration signal;

(b) calculating a velocity signal and a signal energy signal from said deceleration signal, wherein said signal energy signal is calculated by accumulating the absolute difference of successive deceleration signal values taken to a predetermined power greater than two;

(c) comparing said velocity signal to a predetermined discrete velocity threshold and comparing said energy signal to a predetermined discrete energy threshold; and (d) generating a deployment signal when both said velocity signal exceeds said velocity threshold and signal energy signal exceeds said energy threshold.

6. The control of claim 5, wherein said power is empirically chosen to distinguish between collisions which require deployment and collisions which do not require deployment.

* * * * *